Dec. 16, 1952    F. H. MUELLER    2,621,886
DIVERTER VALVE WITH O RING SEAL
Filed Jan. 27, 1949    2 SHEETS—SHEET 1
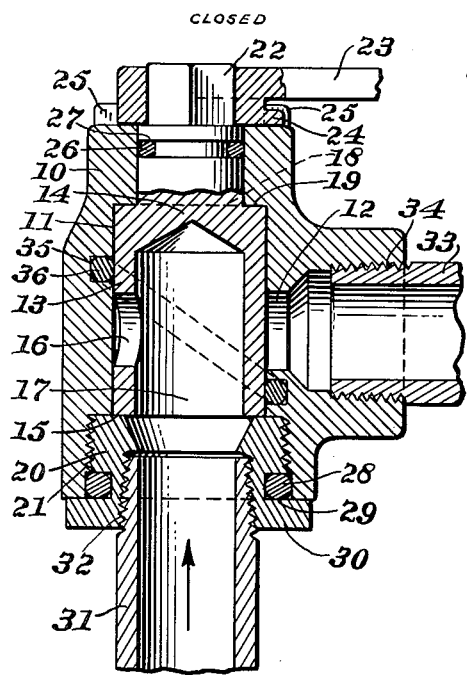
Fig. 1. CLOSED
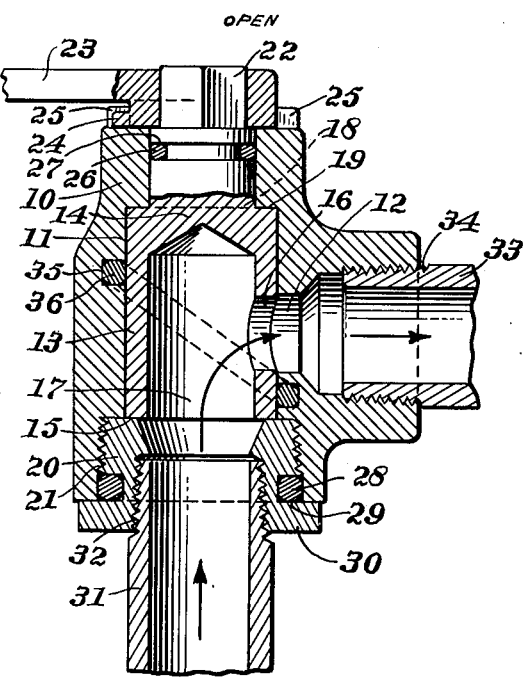
Fig. 2. OPEN
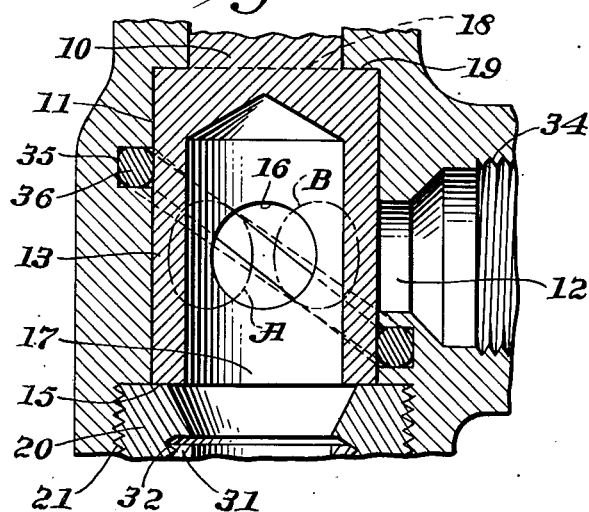
Fig. 3.
Inventor:
Frank H. Mueller,
By Cushman Darby Cushman
ATTORNEYS.

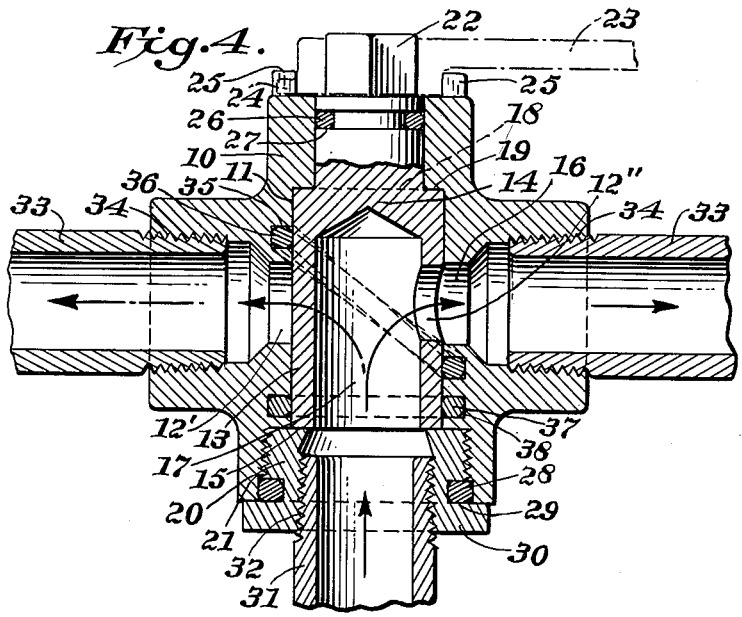
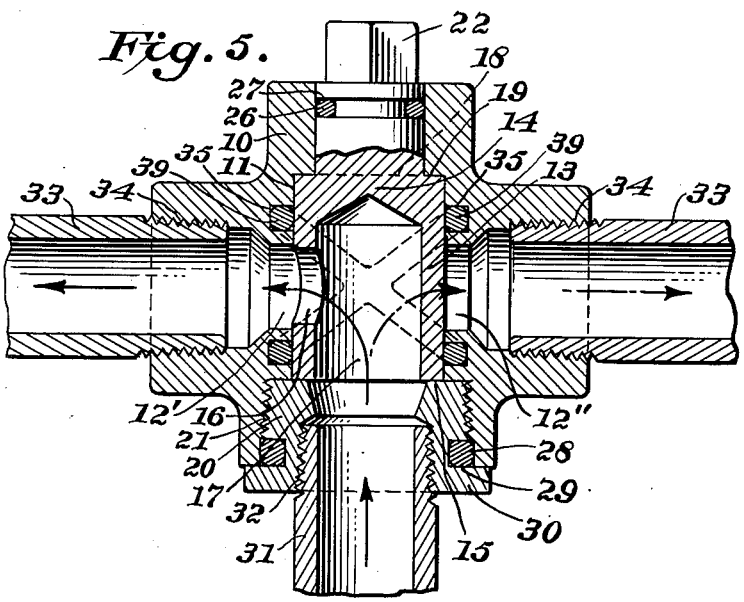

Patented Dec. 16, 1952

2,621,886

UNITED STATES PATENT OFFICE 2,621,886

DIVERTER VALVE WITH O RING SEAL

Frank H. Mueller, Decatur, Ill., assignor to Mueller Co., Decatur, Ill., a corporation of Illinois Application January 27, 1949, Serial No. 73,028

1 Claim. (Cl. 251—95)

This invention relates to rotary plug valves, particularly to rotary plug angle valves, and has for an object the provision of a valve employing a sealing ring disposed diagonally to the plug in a plane intersecting the flow of fluid through the valve.

A further object of this invention is to provide a rotary plug angle valve of simplified construction, adapted for use in a high pressure fluid line.

A further object is to provide a rotary plug switch valve of simplified construction, employing a diagonally disposed sealing ring.

A still further object is the provision of a rotary plug valve for changing the direction of flow of fluid under pressure through an angle of approximately 90°, employing a sealing ring disposed diagonally to the plug.

Further objects of the invention will be in part obvious and in part pointed out hereinafter.

The invention and the novel features thereof may best be made clear from the following description and the accompanying drawings, in which:

Figure 1 is a section through a preferred embodiment of the rotary plug angle valve of this invention, showing the plug in closed position;

Figure 2 is a section corresponding to Figure 1, but showing the plug in open position;

Figure 3 is a fragmentary enlarged section corresponding to Figure 1, but showing the plug in intermediate position;

Figure 4 is a section through a switch valve embodying the principle of the present invention, and Figure 5 is a section through a switch valve conforming generally to that of Figure 4, but modified by the provision of a sealing member of cage-like configuration.

Referring to the drawings, Figures 1, 2 and 3 show a rotary plug angle valve comprising the valve body 10 having the longitudinal bore 11 therethrough, and the lateral outlet port 12 communicating with bore 11, preferably at right angles thereto. Rotatably mounted in bore 11 is the tubular plug 13, provided with the closed end 14 and the opposite open end 15. Plug 13 also comprises the lateral port 16, and the inlet port 17, defined by the open end 15. The plug 13 is provided between lateral port 16 and the closed end 14 thereof with the shoulder 18, maintained in seating engagement with the internal seat 19 of body 10 by the retainer ring 20, in retaining engagement with the open end 15 of plug 13. Retainer ring 20 is suitably affixed to body 10 adjacent open end 15, as by the screw thread 21. It will be noted that the bore seat 19 is so disposed, and shoulder 18 and port 16 so spaced on the plug 13, as to position the port 16 for registry with outlet port 12 when the plug is in open position.

The closed end 14 of plug 13 preferably extends beyond body 10, and comprises the operating stud 22, to which the valve handle 23 is suitably secured. The boss 24 may extend from handle 23, adapted to engage the stops 25, extending from body 10 and positioned to limit the rotation of handle 23 and plug 13 to an arc of substantially 180°, one end of which marks complete registration of plug port 16 with outlet port 12, corresponding to full open position of the valve. The stops 25 and boss 24 may be omitted, however, since the valve is adapted to be rotated from open to closed position and from closed to open position in either direction with equal efficiency, as will presently be more fully apparent.

The annular sealing ring 26 is desirably provided between closed end 14 and body 10 adjacent the end of bore 11, conveniently in the groove 27 provided therefor in the closed end 14, as shown, and the annular sealing ring 28 provided between retainer ring 20 and body 10, conveniently in the retainer ring groove 29. To limit the extent of entry into body 10, retainer ring 20 may be provided with the outstanding collar 30, positioned and adapted to bear upon the adjacent end of body 10. Suitable means, such as the pipe 31, is provided in communication with inlet port 17 of the plug 13 for the introduction of pressure fluid thereinto, preferably in threaded engagement with the internal thread 32 of retainer ring 20, and the outlet pipe 33 may extend from outlet port 12, threaded into the screw thread 34 thereof, or otherwise suitably affixed.

In the surface of bore 11 is provided the diagonal groove 35, encircling the axis of outlet port 12 in a plane disposed to pass between the outlet port 12 and inlet port 17 of the plug 13. In this position, it will be seen, the plane of groove 35 intersects the path of flow through the valve. Retained in groove 35 in sealing engagement with plug 13 is the resilient O-ring or sealing ring 36, made of rubber or similarly suitable resilient material. Sealing ring 36 is preferably of circular or oval cross-section, and of a diameter slightly exceeding the depth of groove 35, so that the sealing ring is normally under slight compression between the walls of the plug and the groove. It is to be particularly noted, however, that the cross-sectional shape of the sealing ring 36 is not critical, and need not be round nor oval, but may be of square, polygonal or other shape or configuration, the effectiveness thereof residing principally in its disposition within the body 10. Similarly, the groove 36 is preferably of square or rectangular cross-section, but may be of triangular or other cross-sectional configuration.

The functioning of the valve will now be described in detail. Fluid under pressure is admitted through pipe 31 to inlet port 17 of plug 13, in the direction of the arrow in Figure 1. The plug 13 and bore 11 being cylindrical, a slight clearance necessarily exists between them by reason of manufacturing tolerances, which enables the pressure fluid to reach the groove 35. With the plug in closed position, as shown in Figure 1, the fluid acts from below in the direction of the axis of plug 13 to compress the resilient sealing ring 36 against the upper or far wall of the groove 35, expanding sealing ring 36 laterally to form an effective seal between body 10 and plug 13. With the plug in this position, it will be readily seen, the diagonal disposition of the sealing ring prevents leakage of pressure fluid to outlet port 12.

The valve is adapted for use with pressures ranging from a few pounds per square inch to extremely high pressures, of the order of five thousand pounds per square inch or more, the maximum feasible pressure being determined primarily by the strength of the valve body and the connections thereto. The higher the pressure in inlet port 17, the greater will be the force compressing sealing ring 36, and the more effective the seal thereof. The effectiveness of the seal may be enhanced by lubricating the groove 35 and sealing ring 36, preferably with a heavy grease. The friction of the seal has been found to be considerably less than that of compression packing elements capable of holding comparable pressures.

With the plug in the open position shown in Figure 2, the pressure fluid readily passes through inlet port 17 and plug 13 to the lateral port 16, now in registry with outlet port 12, and through the lateral port and outlet port, as indicated by the arrow, the direction of flow having changed approximately 90°. In this position, pressure is substantially equalized on opposite sides of the sealing ring 36, and the sealing ring assumes a relaxed position substantially central of the groove 35.

In revolving 180° from closed to open position, the plug port 16, it will be apparent, must traverse the sealing ring 36, as clearly shown in Figure 3. With the plug port moving from left to right, as shown, corresponding to clockwise rotation of the handle 23, the sealing ring is first exposed by the leading edge of port 16 when the edge of the port adjacent bore 11 is in the dotted line position A. With the plug port in this position, the exposed portion of the sealing ring is caused by its own internal pressure to distend or protrude slightly into the port. This tendency is, however, opposed by the full lateral force of the pressure fluid in the plug. The same conditions obtain when the plug port has partially traversed the ring, in the solid line position of Figure 3. When the edge of the plug port adjacent bore 11 reaches the dotted line position B, however, the full force of the pressure fluid is brought to bear upon that section of the sealing ring still exposed by the trailing edge of the port, forcing the exposed section of the ring back into the groove and allowing the trailing edge of the port to pass easily thereover, without damaging contact.

In rotating in the reverse direction, from open to closed position, the same conditions recur, in opposite sequence. With the outer edge of the plug port in position B, the section of the ring exposed by the leading edge of the port tends to expand and protrude slightly thereinto. When the outer edge of the plug port has reached the position A, however, immediately prior to effecting a complete seal, the full lateral pressure of the fluid in the plug is brought to bear upon that section of the ring still exposed by the trailing edge of the port, and the ring is effectively forced back into the groove, enabling the trailing edge of the port to glide easily thereover and complete the seal, without damaging contact with the ring.

As will be evident, the valve operates in the same manner whether the direction of rotation of the plug be clockwise or counter-clockwise. The plug, therefore, may be operated by rotation always in the same direction, or, if desired, its operative movement may be limited to an arc of 180°, as by the stops 25, in the manner previously described. The valve is not adapted to the passage of pressure fluid therethrough in the direction opposite to that indicated, and reversal of the direction of pressure will result in destruction of the sealing ring the first time the valve is closed. Should pressure fluid be admitted to the outlet port 12 rather than the inlet port 17, the sealing ring 36 when traversed by the plug port 16 in moving from open to closed position will not only expand due to its own internal pressure, but the pressure fluid reaching the groove 35 from the outlet port 12 will forcibly cause the ring to bulge out into the then low pressure plug port, a consequence which will be magnified as the trailing edge of the port approaches the ring, and the resulting bulge will be sheared off or severely damaged by passage of the trailing edge thereover, destroying the effectiveness of the sealing ring.

The sealing rings 26 and 28 are desirably of the same type as the resilient sealing ring 36, and function by leakage of pressure fluid within the valve body thereto, to seal the valve body and prevent leakage therepast. Pressure fluid may reach the sealing ring 28 by passage along the screw thread 21, with the plug in any position, and is contained by the lateral expansion of the ring 28 to form an effective seal, in the manner previously described. With the plug in open position, pressure fluid passes along the surface of the plug to the sealing ring 26, which is thereby expanded laterally into sealing relationship with the valve body to prevent leakage of fluid to the exterior of the body.

A further embodiment of the present invention is illustrated in Figure 4, wherein is shown a switch valve provided with two radially spaced outlet ports 12 in the valve body 10. The outlet ports 12 preferably are oppositely disposed and have a common axis, so that the plug port 16 moves out of registry with one and into registry with the other by rotation through 180°. The diagonal groove 35 and the resilient sealing ring 36 are disposed as previously described, encircling the axis of one of said outlet ports in a plane lying between said outlet port and the inlet port 17. The resilient sealing ring functions as described in connection with the previous modification, and, it will be seen, with the plug port 16 in registry with the outlet port 12' lying on the same side of the plane of sealing ring 36 as does the inlet port, effectively prevents the leakage of fluid to the other outlet port 12". When the plug port 16 is in registry with the outlet port 12", however, it will be seen that the sealing ring does not function to prevent the leakage of pressure fluid to outlet port 12'. To prevent this leakage, the additional annular sealing ring 37 is provided between body 10 and plug 13 adjacent the open end 15, conveniently in the groove 38 in the surface of bore 11. The sealing ring 37 is desirably of the same type as the sealing ring 36, and functions in the same manner, effectively sealing off the outlet port 12' when plug port 16 is in registry with outlet port 12". Obviously, more than two outlet ports 12 may be provided, if desired.

A still further modification is shown in Figure 5, wherein a switch valve conforming generally to that of Figure 4 is shown, the bore thereof, however, being provided with two intersecting diagonal grooves 35, one of them lying in a plane between inlet port 17 and the outlet port 12', and the other in a plane between inlet port 17 and the outlet port 12". The integral resilient sealing member 39, of cage-like configuration, conforming generally to the shape of the intersecting grooves 35, is retained in the grooves. The sealing member 39 functions in the same manner as does the resilient sealing ring 36 previously described, and effectively seals off the outlet port 12' or 12" not in registry with the port 16. The configuration of the intersecting diagonal grooves 35 and the sealing member 39, it will be readily seen, obviates the necessity for the groove 38 and the sealing ring 37 provided in the modification of Figure 4.

The switch valves of Figures 4 and 5, in common with the valve of Figures 1 to 3, are not adapted to the passage of pressure fluid therethrough in a direction opposite to that indicated. The admission of pressure fluid to either of the outlet ports 12' or 12" will result in destruction of the sealing ring 36 in the case of the valve of Figure 4, and of the sealing member 39 in the case of the valve of Figure 5, when the plug is rotated 180° in either direction. The behavior of the sealing ring or sealing member in this case is substantially identical to that described in connection with the valve of Figures 1 to 3, pressure in a lateral outlet port causing the sealing ring or member to bulge out into the port 16 when traversed thereby, preventing the trailing edge of the port from passing thereover without damage thereto.

It will thus be seen, that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

An angle valve for controlling the flow of fluid under pressure, comprising a valve body having a longitudinal bore therethrough and two opposed lateral outlet ports communicating with said bore, a tubular plug rotatably mounted in said bore, said plug having a lateral port positioned for successive registry with each of said outlet ports in the course of a revolution of said plug, one end of said plug being closed and the other end being open and constituting an inlet port, a diagonally disposed groove in the wall of said bore encircling the axis of one of said outlet ports in a plane lying between said outlet port and said inlet port, a resilient sealing ring in said groove, a sealing ring between said plug and said body adjacent and spaced from the open end of said plug, and means in communication with said inlet port for introducing fluid under pressure thereinto.

FRANK H. MUELLER.

REFERENCES CITED

The following references are of record in the file of this patent:

UNITED STATES PATENTS

| Number | Name | Date |
|---|---|---|
| 862,826 | Kieren | Aug. 6, 1907 |
| 1,243,237 | Wood | Oct. 16, 1917 |
| 1,554,470 | Trumble | Sept. 22, 1925 |
| 2,433,732 | Brown | Dec. 30, 1947 |
| 2,484,723 | Pain | Oct. 11, 1949 |
| 2,505,951 | Feaster | May 2, 1950 |

FOREIGN PATENTS

| Number | Country | Date |
|---|---|---|
| 3,184 | Great Britain | of 1884 |
| 9,032 | Great Britain | of 1889 |
| 237,463 | Switzerland | of 1943 |
| 710,360 | France | of 1931 |